United States Patent [19]
Wymann

[11] Patent Number: 4,614,358
[45] Date of Patent: Sep. 30, 1986

[54] STABILIZER FOR VEHICLES

[75] Inventor: Markus Wymann, Niederweningen, Switzerland

[73] Assignee: Bucher - Guyer AG, Niederweningen/Zurich, Switzerland

[21] Appl. No.: 722,321

[22] Filed: Apr. 12, 1985

[30] Foreign Application Priority Data

Apr. 19, 1984 [CH] Switzerland .......................... 1973/84

[51] Int. Cl.[4] ........................ B60G 21/00; B60G 11/26
[52] U.S. Cl. .................................... 280/689; 280/665; 280/700; 280/721; 267/57
[58] Field of Search ............... 280/676, 679, 684, 689, 280/721, 723, 665; 267/57, 57.1 A, 57.1 R

[56] References Cited

U.S. PATENT DOCUMENTS 2,409,507 10/1946 Mett et al. ........................ 280/677
2,545,956  3/1951 Julien ................................ 267/57
2,753,007  7/1956 Read ................................. 280/689
4,206,935  6/1980 Sheppard .......................... 280/723

Primary Examiner—John J. Love
Assistant Examiner—Karin L. Ferriter
Attorney, Agent, or Firm—Edmund M. Jaskiewicz

[57] ABSTRACT

A device for stabilizing against roll in a vehicle has the longitudinally disposed central frame members and a rigid axle is attached at the outer end of each frame member. The central frame members are constructed as trapezoidal shaped torque frames tapering toward their inner opposed ends. The shorter parallel sides which are the opposed inner ends of the trapezoidal torque frames are pivotably mounted at their midpoints to the vehicle chassis and each central frame member is resiliently supported at the opposite longitudinal sides of the chassis by laterally attached links pivotably mounted on a torsion rod the ends of which are movably supported from the vehicle frame.

11 Claims, 7 Drawing Figures

STABILIZER FOR VEHICLES

The present invention relates to a stabilizer for motor vehicles, more particularly, to such a device for the reduction of roll motion on a vehicle having rigid axles each of which is mounted on a central frame member.

It is well-known that when traveling around curves on highways or roads, the vehicle body will tilt to one side, largely because of the effects of centrifugal force. A tilting of the vehicle body will also occur when the vehicle travels over uneven terrain or on sloping terrain. This sloping or rolling of the vehicle body adversely effects the comfort of passengers in the vehicle and also may have a negative effect on the safety of the vehicle.

It has been known to provide various types of stabilizer devices in order to reduce side tilt of particularly those vehicles having a soft suspension.

Other forms of stabilizer devices react to uneven road surfaces by providing, for example, that the diagonally opposite wheels will compress or rebound even though there is no side tilting of the vehicle as result of these uneven road surfaces. Accordingly, such stabilizer devices may result in undesired fluctuations in the loads on the individual wheels, torsional stresses on the frames of the vehicle and significantly decrease the cross country capability of the vehicle.

Another effort to counter this rolling or tilting of the vehicle includes a stabilizer according to DE-OS No. 22 52 017 in which each of two diagonally opposite vehicle wheels is connected to a torsion rod arrangement in which according to the embodiments having a rigid axle, two piece torsion rods connected by levers are mounted on the underside of the suspension. Such a stabilizer arrangement is rather complicated and is relatively expensive both to manufacture and to install on a vehicle of the type described above.

It is therefore the principal object of the present invention to provide a novel and improved device for stabilizing a vehicle against roll.

It is another object of the present invention to provide such a stabilizing device which is relatively simple in construction and inexpensive to manufacture and install. It is a further object of the present invention to provide a stabilizing device for vehicles having rigid axles which avoids torsional stresses on the vehicle frames, significantly reduces fluctuations of wheel load and greatly enhances the cross country capability of the vehicle without adversely affecting the structural and functional properties of the axles.

The objects of the present invention are achieved and the disadvantages of the prior art as discussed above are eliminated by providing such a vehicle with longitudinally disposed central frame members the inner ends of which are pivotably connected to the vehicle chassis and the opposite longitudinal walls of the central frame members are flexibly supported to the chassis.

According to one aspect of the present invention, there is provided a device for stabilizing a vehicle against roll which vehicle has rigid axles and the axles are each mounted on an end of longitudinally disposed central frame members. These central frame members have opposed ends disposed on the longitudinal axis of the vehicle and these opposed ends are pivotably connected to the chassis of the vehicle. Means are also provided for flexibly connecting each of the central frame members opposed ends to opposite longitudinal sides of the chassis.

This construction of the central frame members substantially simplifies the construction of the vehicle stabilizer and makes possible a significant improvement of the mechanical properties of the stressed parts.

As modifications, the central frame members may be constructed as torsion tubes or may be constructed in the shape of trapezoidal frames which taper toward their inner opposed ends.

Other objects and advantages of the present invention will be apparent upon reference to the accompanying description when taken in conjunction with the following drawings wherein.

Proceeding next to the drawings wherein like reference symbols indicate the same parts throughout the various views a specific embodiment and modifications of the present invention will be described in detail.

Figure 1:
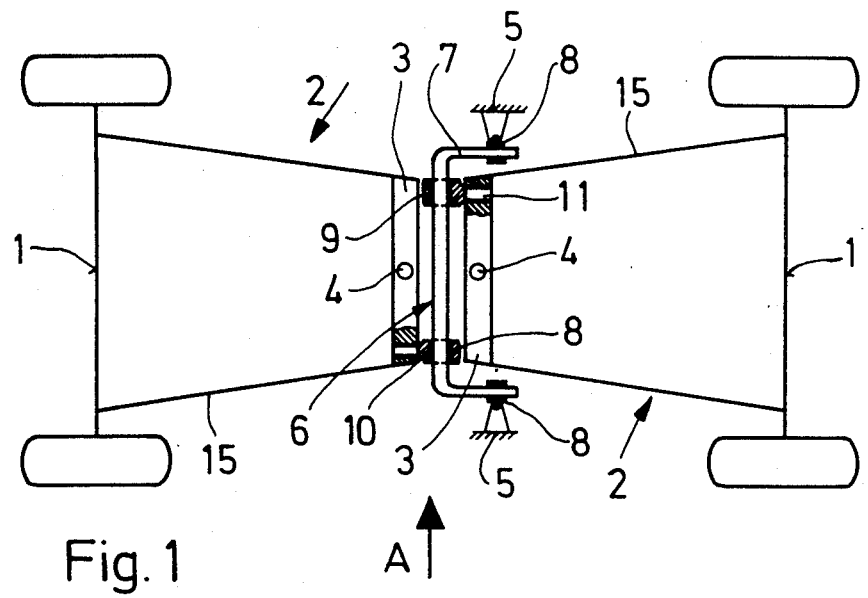
FIG. 1 is a top plan view of a stabilizing device for a vehicle according to the present invention.

In FIG. 1, there is illustrated a stabilizing device for a vehicle having two rigid axles 1. Each axle 1 is mounted as one of the parallel ends of a trapezoidal shaped central frame member 2. Each frame member tapers inwardly to opposed ends at which there are provided support beams 3 which are at right angles to the central longitudinal axis of the vehicle. The central frame members 2 are disposed longitudinally of the vehicle and substantially parallel to the chassis of the vehicle.

The support beams 3 on the inner opposed ends of the central frame members are substantially parallel to each other and spaced as shown and each is pivotably connected to the underside of the vehicle by an articulated or ball joint indicated at 4. The central frame members 2 are thus pivotable about the pivot connections 4 and the freedom or extent of movement of the central frame members 2 is determined by the manner in which the central frame members are fastened to the chassis of the vehicle.

According to FIG. 1, a torsion rod 6 is provided between the and parallel to the support beams 3. The torsion rod 6 has bent or offset lever-like ends 7 which are located on the opposite longitudinal sides of the vehicle chassis here indicated at 5. The offset ends 7 are slidably positioned in swivel bearings 8 which are pivotably connected to the chassis 5.

Opposite to the pivot connections 4 of the central frame members 2 and offset laterally with respect to the pivot connections, there are provided links 9 each of which connects the torsion rod 6 to a support beam 3 of the central frame member 2. Each link 9 is provided with a bushing 10 which is axially displaceable and rotatable upon the torsion rod 6. A pivot pin 11 extends from each link 9 at substantially a right angle to the axis of rotation of the bushing 10 and each pivot pin is seated in a support beam 3 of a central frame member 2.

Each central frame member 2 is constructed as a trapezoidal torque frame which tapers toward its respective pivotal connection 4 and it has been found that this construction provides advantageous mechanical and structural properties. The pivotable connection of each central frame bracket to the torsion rod by a laterally offset link provides a significantly greater degree of elasticity and flexibility in the stabilizing device than has been previously known.

In accordance with the present invention, it would be possible to position the support beams 3 and the torsion rod 6 so as to maintain their parallel relationship to each other but to be positioned at an angle with respect to the central longitudinal axis of the vehicle. Accordingly, the lateral support points between the ends of the torsion rod and the chassis will be spaced from each other in a longitudinal direction.

Figure 2:
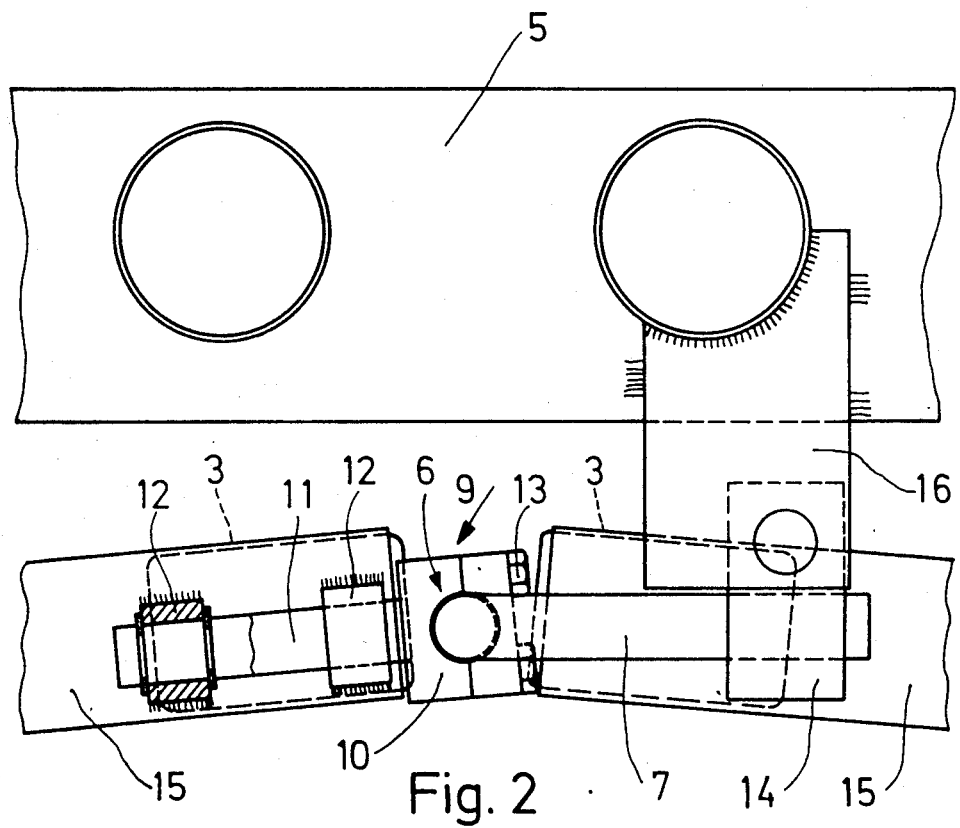
FIG. 2 is a side view in enlarged scale of a portion of the device illustrated in FIG. 1 as viewed along the arrow A.

Other modifications can be made in the structure without departing from the scope of the present invention. As shown in FIG. 2, the links 9 can be mounted opposite each other and connected to a lateral or side frame member 15 of the respective central frame member 2. For this purpose, two bearings 12 are provided to receive the pivot pin 11. One of the bearings 12 is further provided with rings or bushings as shown to retain the pivot pin 11 against axial movements with respect to the bearings 12. The bushing 10 is divided into two parts along its axis of rotation and these parts are connected to each other by means of screws 14. The offset ends 7 of the torsion rod are displaceably supported in a link 14 constructed as a swivel joint mounted on the lower end of a support 16 which is fastened to the vehicle chassis 5 to provide an easily maintained structure.

Figure 3:
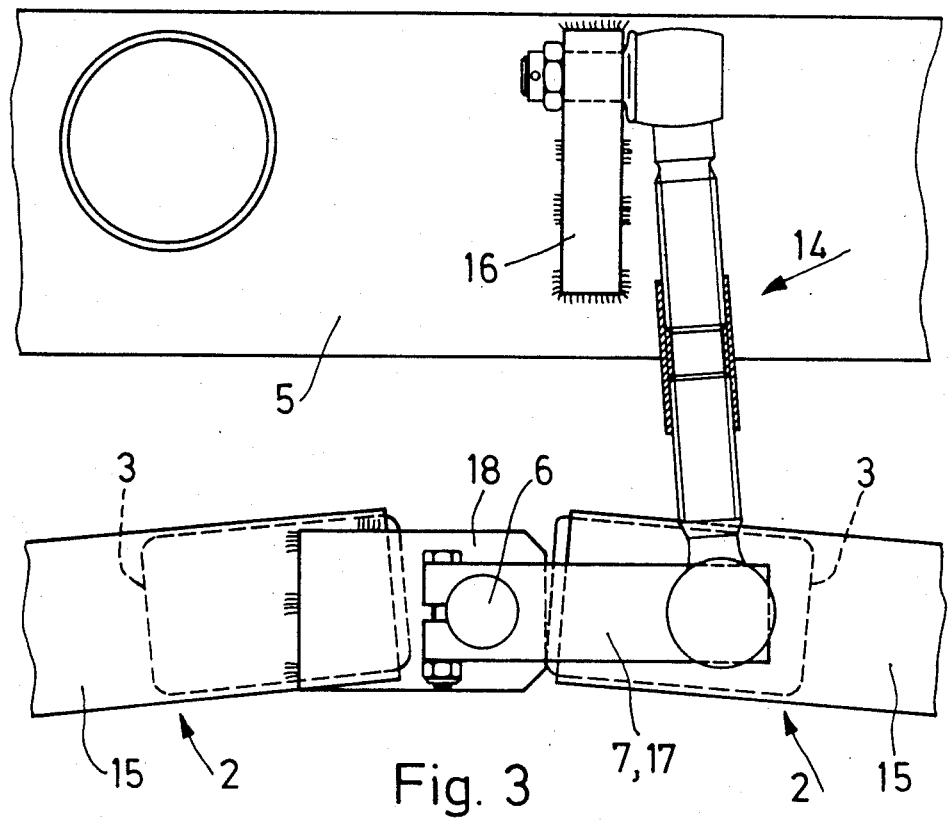
FIG. 3 is a view similar to that of FIG. 2 but showing a modification thereof.

FIG. 3 shows a further modification of the support of the opposed inner ends of the central frame brackets 2 with respect to the vehicle chassis. In this modification, the offset ends of torsion rod 6 are constructed in the form of connecting elements 17 which are firmly clamped to the ends of the continuous torsion rod 6 and these elements 17 are pivotably connected by means of supporting links 14 to a support bracket 16 fixedly attached to the vehicle chassis 5. In this modification, the supporting link 14 may be in the form of a conventional shock absorber as used on motor vehicles. The use of such a conventional shock absorber again decreases the cost of the stabilizing device since it permits the use of conventional and readily available components.

The torsion rod 6 is connected to the central frame brackets 2 by means of bearings 18 each of which is fastened to the opposite side frame members 15 of the respective central frame brackets 2.

Figure 4:
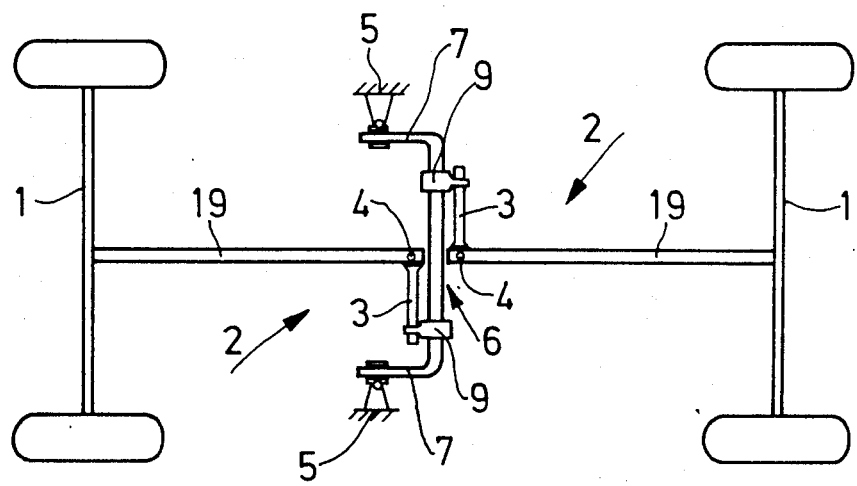
FIG. 4 is a top plan view of another form of a stabilizing device of a vehicle according to the present invention.

In FIG. 4, there is shown a modification of the central frame members 2 wherein each of these central frame members is constructed as a torsion tube 19 located along the central longitudinal axis of the vehicle. One end of each tube 19 is rigidly connected to its respective axle 1 and its other end is pivotably connected to the frame of the vehicle at pivot connection 4 and these pivot connections are located in substantially the central portion of the suspension. In the area of the pivot connections 4, each torsion tube 19 is provided with a lateral extending support arm 3 which projects at a right angle with respect to the torsion tube. Each support arm 3 is connected to the torsion rod 6 by links 9 in a manner as previously described. The torsion rod 6 is located between the pivot points 4 as may be seen in FIG. 4. The offset ends 7 of the torsion rod 6 are directed from the opposite direction as compared to the embodiment of FIG. 1 and, if desired, the structure of FIG. 2 could be used.

Figure 5:
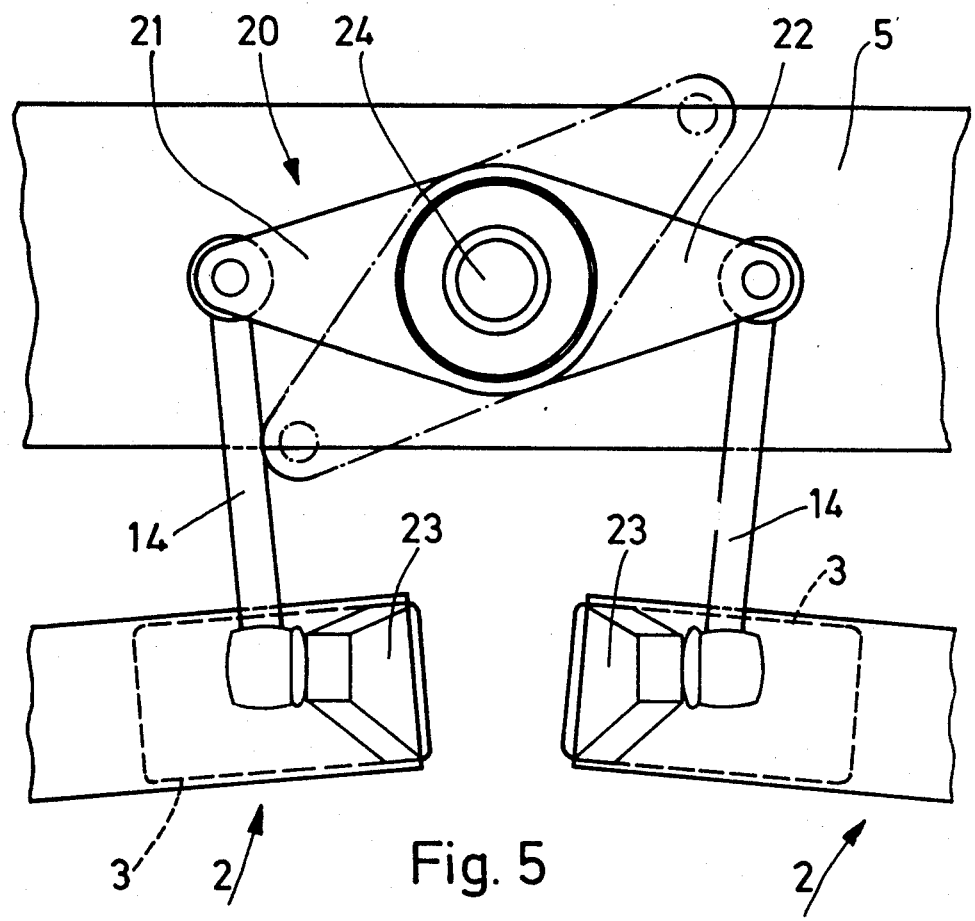
FIG. 5 is a view similar to that of FIG. 2 but showing a further modification thereof.
Figure 6:
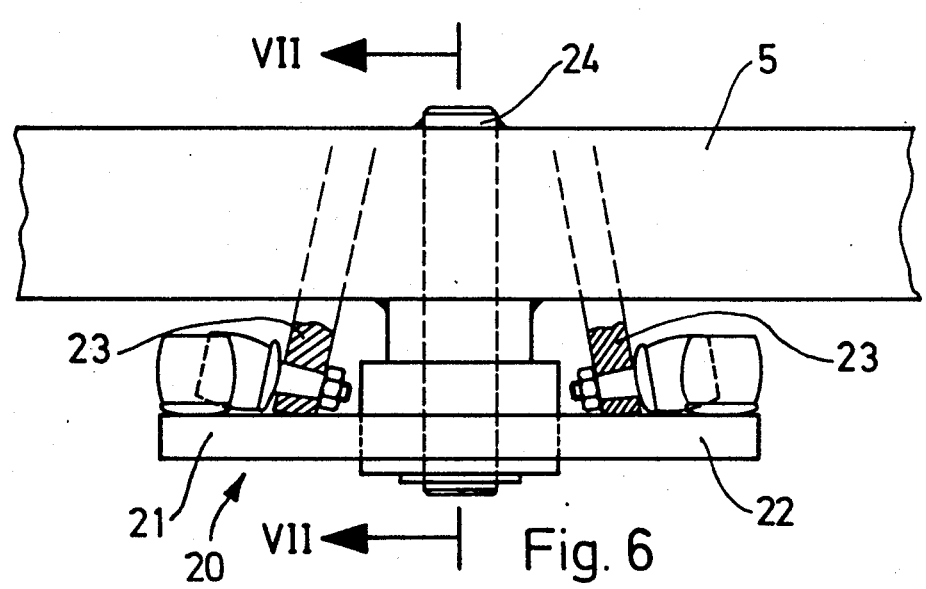
FIG. 6 is a top plan view of the device shown in FIG. 5.
Figure 7:
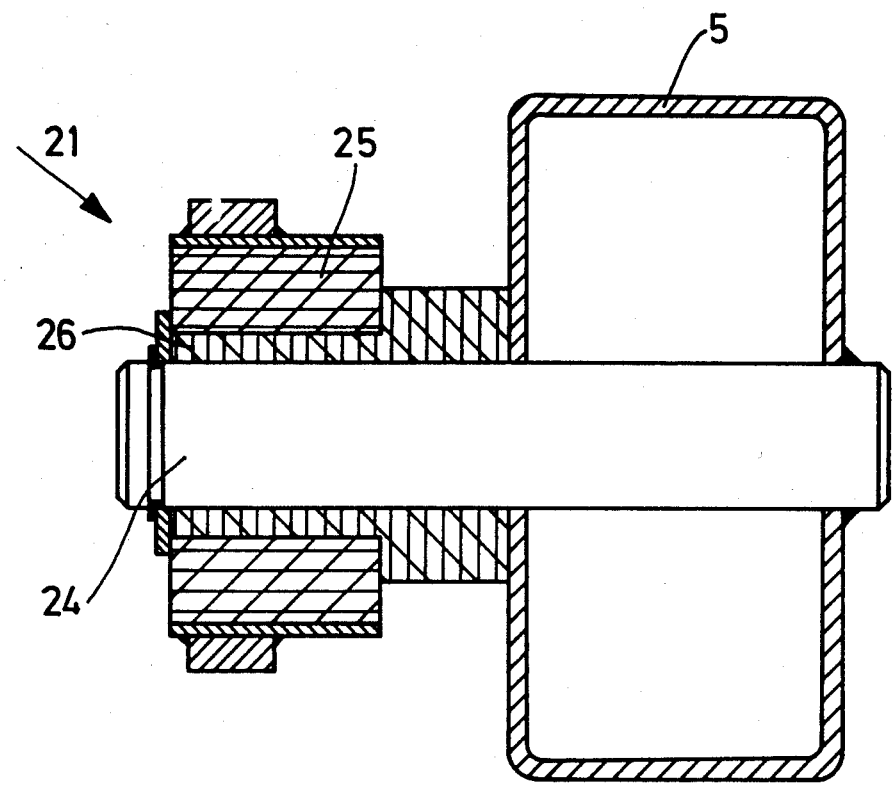
FIG. 7 is a sectional view taken along the line VII—VII of FIG. 6.

In the modification of FIGS. 5 and 6, on a longitudinal side of the chassis 5, a balance arm 20 is mounted upon a horizontal shaft 24 which extends transversely of the chassis. The balance arm 20 has a pair of lever arms 21 and 22 each of which is connected by links 14 to extensions 23 which project outwardly from the ends of the support beams 3 of the respective central frame members 2. The mounting of the balance arm 20 on the transverse shaft 24 is more clearly illustrated in FIG. 6. The particular construction of the balance arm arrangement is shown in greater detail in FIG. 7 where it is seen that the balance arm is provided with a hub or collar 25 which is mounted on a bushing 26 pressed onto the transverse shaft 24. The supports 23 can be connected resiliently by springs or spring-like elements to the lever arms 21 and 22 of the balance arm 20. Such a construction would provide considerable protection from various shocks and impacts to which the vehicle may be subjected.

Thus it can be seen that the present invention has disclosed a simple but effective device for stabilizing a vehicle against roll where the vehicle is provided with rigid axles. Each rigid axle is mounted at the end of a central frame member whose other end is pivotably connected to the vehicle frame and also has its longitudinal or side member resiliently connected to the vehicle frame. The mounting and connecting of each of the central frame members in this manner provides a high degree of flexibility but at the same time a highly structurally sound suspension system. A vehicle thus equipped has enhanced cross country capabilities and has a higher degree of safety and control when negotiating curves on roads or highways.

It will be understood that this invention is susceptible to modification in order to adapt it to different usages and conditions, and accordingly, it is desired to comprehend such modifications within this invention as may fall within the scope of the appended claims.

What is claimed is:

1. In a device for stabilizing a vehicle against roll, said vehicle having a pair of longitudinally disposed central frame members, each having first and second ends, the first ends of said central frame members opposed from each other on the longitudinal axis of the vehicle, said vehicle having rigid axles and said axles each mounted on one of longitudinally disposed central frame members, means for pivotably connecting said central frame member opposed ends respectively to the chassis of the vehicle, and means for flexibly connecting said central frame member opposed ends to opposite longitudinal sides of the chassis.

2. In a device as claimed in claim 1, and further comprising a support beam extending transversely to the direction of movement of the vehicle provided on each of the first ends of said central frame members which extend substantially parallel to the chassis.

3. In a device as claimed in claim 2 and further comprising a torsion rod disposed between said support beams and substantially parallel thereto, said torsion rod having offset ends, said flexibly connecting means comprising means for pivotably supporting said offset ends from the vehicle chassis and means comprising laterally offset links for pivotably connecting said torsion rod to each of said central frame members.

4. In a device as claimed in claim 3 wherein said pivotably supporting means comprises swiveled bearings and said offset ends being axially displaceable in said swivel bearings.

5. In a device as claimed in claim 3, wherein said offset links each comprise a bushing and a pivot pin extending therefrom substantially perpendicularly to the rotary axis of the respective bushing, said pivot pins being pivotably supported in said respective support beams, said bushings being axially displaceable and rotatable on said torsion rod.

6. In a device as claimed in claim 3, wherein said pivotably supporting means comprises swiveled bearings mounted on said chassis and supporting links connecting said offset ends of said torsion rod to said swiveled bearings.

7. In a device as claimed in claim 1, wherein said central frame members and their axles mounted thereon each have the shape of a trapezoid tapering towards said opposed ends.

8. In a device as claimed in claim 1, wherein said central frame members each comprises a torsion tube disposed along the central longitudinal axis of the vehicle, a supporting arm extending laterally from the opposed end of each of said torsion tubes, a torsion rod disposed between said opposed ends of said torsion tubes and at right angles thereto, and means for pivotably and axially displacably connecting said supporting arms to said torsion rod.

9. In a device as claimed in claim 2, wherein each of said support beams has a lateral extension therefrom, a balance arm having a pair of lever arms and pivotably mounted on a horizontal shaft extending laterally of the vehicle chassis, and means for pivotably connecting each of said support beam extensions to a respective one of said lever arms.

10. In a device as claimed in claim 2, and further comprising a balance arm having a pair of lever arms and pivotably mounted on a horizontal shaft extending laterally of the vehicle chassis, and means for resiliently connecting each of the support beams of said central frame members to a respective one of said lever arms.

11. In a device as claimed in claim 1, wherein each of said central frame members comprises at least one side beam, a torsion rod disposed between the opposed ends of said central frame members and substantially parallel thereto, said torsion rod having offset ends, means for pivotably supporting said offset ends from the vehicle chassis, and means comprising oppositely directed links for pivotably connecting said torsion rod to a respective one of said side beams of said central frame members.

* * * * *